Feb. 14, 1961 R. A. JEWELL 2,971,771
ENDLESS TRACK BALL SPRING SUSPENSION FOR VEHICLES
Filed June 12, 1958
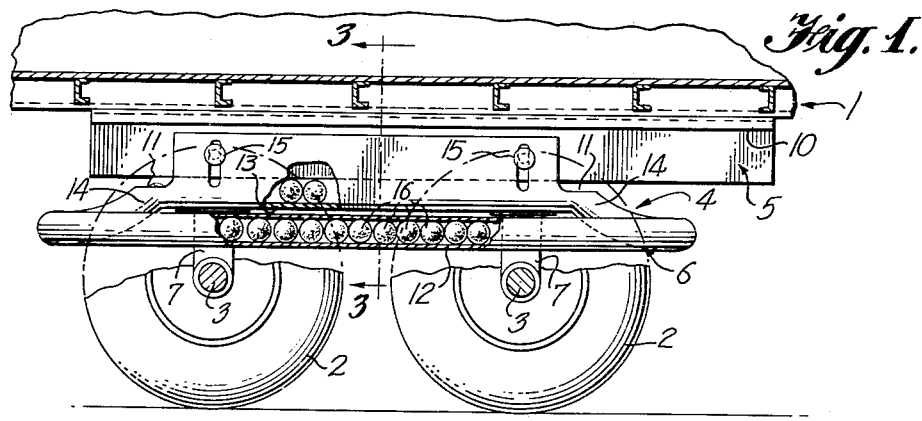
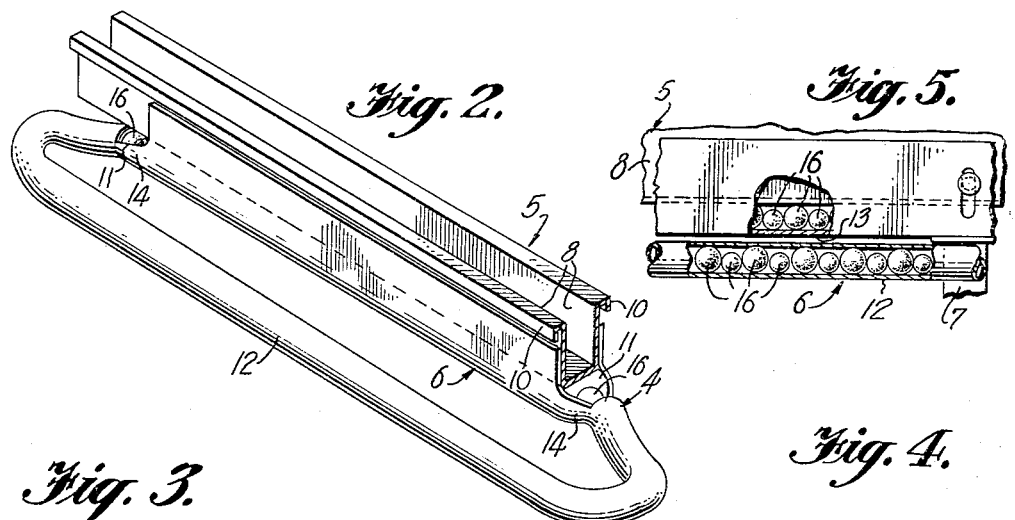
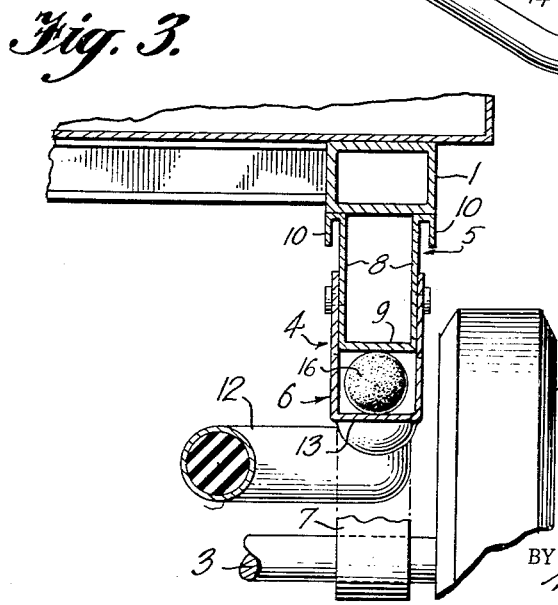
INVENTOR
Robert A. Jewell
BY Mason, Fenwick & Lawrence
ATTORNEYS

United States Patent Office 2,971,771
Patented Feb. 14, 1961

2,971,771

ENDLESS TRACK BALL SPRING SUSPENSION FOR VEHICLES

Robert A. Jewell, Savannah, Ga., assignor to Great Dane Trailers Inc., Savannah, Ga., a corporation of Georgia Filed June 12, 1958, Ser. No. 741,657

9 Claims. (Cl. 280—104.5)

This invention relates to vehicle suspensions which utilize resilient compressible means for supporting and cushioning the load.

It has been common practice in many fields where it is desirable to provide a cushion support for loads of various kinds to utilize a resilient material such as rubber to absorb blows or impacts and thus keep the supported load, to a degree at least, shock free. So far as it is known, this practice has been confined to the use of cushioning material in a manner to utilize only its compression under load, and the material has been held against other movement.

The principal object of the present invention is to provide a suspension which employs a plurality of resilient deformable and rollable members which are unconfined for movement in at least two directions, to achieve automatic spring rate variation as loads are applied and universal movement of the supported load.

Another object of the invention is to provide such a support wherein movement of the load supporting means may be had in two directions without losing support at any point along a predetermined supporting area.

A further object is to provide a suspension of this kind which will permit rocking movement to take care of differential axle deflections such as are present in a tandem axle running gear.

Yet another object is the provision in a suspension of this nature of means for confining the deformable units which has separable parts, freely movable relative to one another, to allow for deflection at any point along the supported area.

Other objects of the invention will become apparent from the following description of one practical embodiment thereof, when taken in conjunction with the drawings which accompany, and form part of, this specification.

In the drawings:

Figure 1 is a partial vertical section through a vehicle body, chassis and tandem running gear, showing somewhat schematically a suspension embodying the principles of the present invention, parts being broken away to show the deformable spheres which form the load supporting members;

Figure 2 is a perspective view of the suspension unit removed from the vehicle;

Figure 3 is a vertical transverse section taken on the line 3—3 of Figure 1;

Figure 4 is a view similar to Figure 3 showing the suspension means under load; and Figure 5 is a view of the suspension unit frame members in longitudinal section, with a modified arrangement of the load supporting elements.

In general, the invention concerns a spring suspension which includes a tubular track in the form of a closed circuit filled with spheres of resilient, deformable material, with a portion of the tube casing cut away to permit the load to be suspended to be imposed upon the spheres.

Referring to the drawings in detail, there is shown in Figure 1 a portion of a vehicle body mounted on a chassis 1, supported on tandem wheels 2. The chassis is connected to the wheel axles 3 through a suspension means 4.

The suspension device consists of an upper load-imposing member 5, fixed to the vehicle frame, and a lower load-supporting member 6 which is attached to the axle, or axles, as the case may be, by brackets 7.

The upper frame member 5 may be in the form of a channel having spaced vertical walls 8 and a lower bridge member 9. The upper edges of the walls 8 may have suitable flanges 10 for mounting the channel to the vehicle frame.

The lower member 6 provides a continuous track having an open-top, load-supporting section 11 within which the upper member 5 fits telescopically, and a return section 12, having its ends connected to the ends of the section 11 to complete the track circuit. The load-supporting track section 11 is channel shaped having a flat bottom 13 and spaced side walls 14. The walls 14 are spaced apart a sufficient distance to permit the upper suspension member 5 to fit freely between them and have a vertically floating movement as will be described. The two suspension members may be connected by any suitable means to permit relative movement between them, such as the pin and slot connections 15. The return section 12 of the lower member will be closed, and is shown as having circular cross-section.

The entire track will be filled with spherical members 16 of a resilient, deformable material, such as rubber. There will be some spacing between the support members 16 to permit at least a minimum deformation before contact between the members is made. Under load, the members will contact and bodily movement of one in the track will be transmitted to the next to cause movement of the group. In this way, the section 11 of the track is always kept full of the support members, as the movement of one out of that section will be transmitted by others through the return track 12 to cause another to enter section 11 at the opposite ends.

When the device is assembled for use, and before load is imposed, the support members will maintain their spherical shape, as shown in Figure 3. As the load is imposed, the members 16 within the section 11 will be compressed between the bottoms 9 and 13 of the housing members 5 and 6, as is shown in Figure 4. The greater the load, the greater the compression, and, of course, the greater the resistance of the support members to increased compression. By selecting the amount of free space to be within the track, and thereby the spacing between undeformed support members without contact, a stepped automatic adjustment to load is provided, as the deformation rate per unit load of the support members will increase considerably when contact between the support members is made. Thus, an automatic spring rate change is provided which will progressively increase as the load increases, with a greater step of increase occurring when the support members have been deformed to contact one another.

It will be seen that the frame members 5 and 6 can have a rocking movement relative to one another as the wheels of the tandem gear pass over uneven roads in succession. Thus, the support members at one end of the exposed track section will be deformed to a greater extent than those at the other end. The rocking movement, and the relative longitudinal movement of the frame members occasioned thereby, will cause the support members to roll over the track bottom 13 and provide a substantially friction-free support. As described above, the movement of one support member will be imparted to all so that uniform movement of all of the members in the track will be had. It will be obvious that with the suspension disclosed that full support will be provided along the entire length of the exposed track section as the support members can adapt themselves to the load at all points.

In Figure 5 a modified arrangement is shown where the support members are provided in two diameters with the members of the two sizes alternating along this track. This form of the device will operate similarly to the one described above, except that another definite stage of increased support will be provided. In other words, one progressively increasing rate of deformation will take place while the load is supported on the larger support members, and a second rate will begin when the larger members have been deformed to a degree sufficient to allow the load to be imposed on all support members in the exposed track section.

While in the above practical embodiments of the invention have been disclosed, it will be understood that the details of construction shown and described are merely by way of example and the invention may take other forms within the scope of the appended claims.

What is claimed is:

1. Vehicle suspension means comprising, an endless track having a portion open at the top and the remainder enclosed, an endless row of spherical support members of resilient deformable material on said track, and a load-bearing member resting upon the support members in the open topped portion of the track.

2. In vehicle suspension means as claimed in claim 1, means interconnecting the track and load bearing member while permitting relative movement between them.

3. In vehicle suspension means as claimed in claim 1, said support members being all of the same size.

4. In vehicle suspension means as claimed in claim 1, said support members being of two sizes and arranged along the track in alternation.

5. Vehicle suspension means comprising, an endless track having a predetermined length thereof open at the top and the remainder enclosed, an endless row of rollable support members of resilient deformable material on said track and freely movable therealong, said support members being in contact with one another when a predetermined load is imposed upon the members in the open top length of the track, and a load-bearing member freely movable vertically within the open top length of the track and resting upon the support members in said track length.

6. Vehicle suspension means as claimed in claim 5 wherein wheel axles are supported from the track at spaced points along the open length of the track.

7. Vehicle suspension means for resiliently supporting a vehicle load upon the vehicle running gear comprising, an endless track having a straight section open at the top at least along a part of the straight portion, an endless row of rollable support members on the track and movable therealong, the rollable support members being of material having rubber-like characteristics of resilience and deformability, said running gear being fixed to the track and means seated within the open top of the track and upon the rollable support members to carry the vehicle load.

8. Vehicle suspension means for resiliently supporting a vehicle load upon the vehicle running gear as claimed in claim 7 wherein the support members will be in contact with one another when a predetermined load is imposed upon the members.

9. Vehicle suspension means for resiliently supporting a vehicle load upon the vehicle running gear as claimed in claim 7 wherein the running gear includes wheel axles connected to the track at spaced positions along the open length thereof.

References Cited in the file of this patent

UNITED STATES PATENTS

| | | |
|---|---|---|
| 123,999 | King | Feb. 27, 1872 |
| 992,008 | Lane | May 9, 1911 |
| 1,823,401 | Johnson | Sept. 15, 1931 |
| 1,973,816 | Kruckenberg | Sept. 18, 1934 |
| 2,493,342 | Eldred | Jan. 3, 1950 |
| 2,497,424 | Terdina | Feb. 14, 1950 |
| 2,672,379 | McVey | Mar. 16, 1954 |